Jan. 3, 1939. R. M. NARDONE 2,142,757

BRAKE MECHANISM FOR ENGINE DRIVEN PROPELLERS

Filed Dec. 21, 1935

INVENTOR.
Romeo M. Nardone
BY
ATTORNEY.

Patented Jan. 3, 1939

2,142,757

UNITED STATES PATENT OFFICE 2,142,757

BRAKE MECHANISM FOR ENGINE DRIVEN PROPELLERS

Romeo M. Nardone, East Orange, N. J., assignor to Eclipse Aviation Corporation, East Orange, N. J., a corporation of New Jersey Application December 21, 1935, Serial No. 55,566

2 Claims. (Cl. 188—71)

This invention relates to internal combustion engines and more particularly to means for controlling the rotation of the propeller shaft or other loads normally driven thereby.

While the invention is of decided utility when applied to engines used on airplanes, in which application it functions to bring the propeller promptly to a full stop in response to de-energization of the engine, it is to be understood that in its broader aspects the invention is applicable to any internal combustion engine adapted to drive a load which has the objectionable tendency to continue in motion after de-energization of the engine.

If an airplane engine stalls for any reason, it is desirable to bring both the engine and its propeller to a dead stop in order to decrease the propeller drag and prevent any aggravation of the injurious effects which such failure of the engine produces. It is particularly necessary that this free rotation of the propeller be prevented in any installation where the propeller is located off the center line of the plane, as for example, in a multi-engine plane. It is accordingly an object of the present invention to prevent such continued rotation of the propeller of an airplane engine which has for any reason failed.

Figure 1:
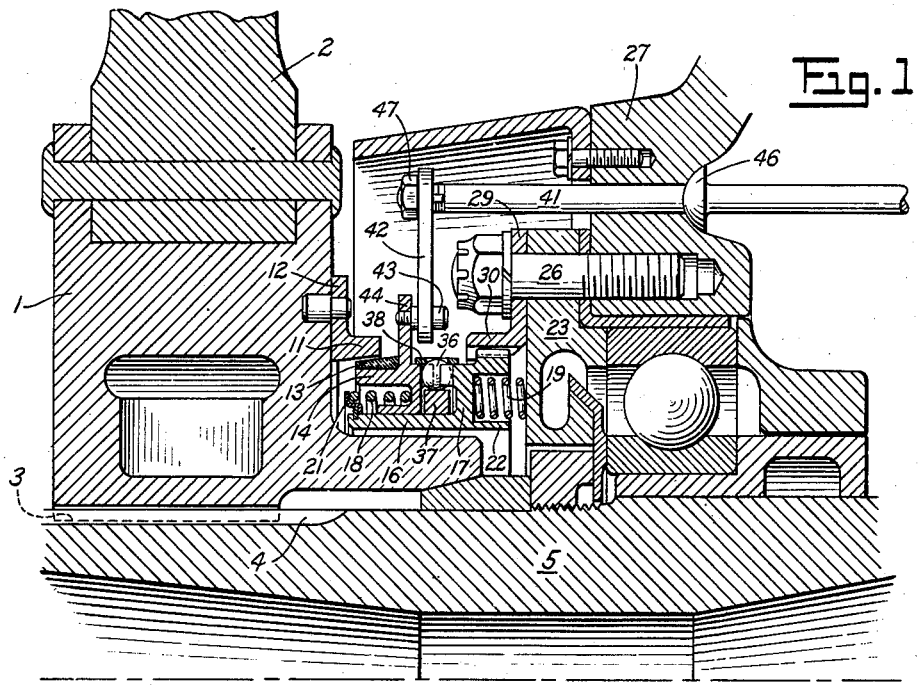
Fig. 1 is a longitudinal sectional view of the device embodying the invention.

Reference character 1 designates a propeller hub having the conventional radially disposed sockets to receive the blade roots, one of which is shown at 2, and the conventional splines or keys 3 for driving connection with corresponding keys or splines 4 of the engine crankshaft 5, or extension thereof, for rotation therewith.

The brake includes an internally tapered ring 11 having a flange 12 to provide for its fixation upon the hub 1, and a correspondingly tapered brake shoe 13 secured to a brake element 14 slidable as well as angularly shiftable along the outer surface of the cylindrical extension 16 of an annular pressure plate 17, to engage or withdraw from engagement with the propeller drum 11.

The brake element 14 and pressure plate 17 are urged into engagement by springs 18 and 19, the former being secured at its outer end against a spring seat 21 fixed to the extension 16 of plate 17, while spring 19 is one of a series of spring coils disposed in angularly spaced pockets 22 of plate 17, and abutting axially fixed abutment ring 23. Bolts 26 not only secure the ring 23 to the cowling 27, but also serve to hold in place a second ring 29 having a toothed hub 30 to lock pressure plate 17 against angular displacement, although permitting axial movement of the said plate along the teeth or splines of the hub.

Figure 2:
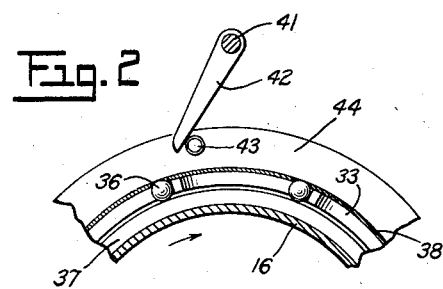
Figs. 2 and 3 are diagrams indicating the "on" and "off" positions of the brake applying lever, in its relation to the movable drum.
Figure 3:
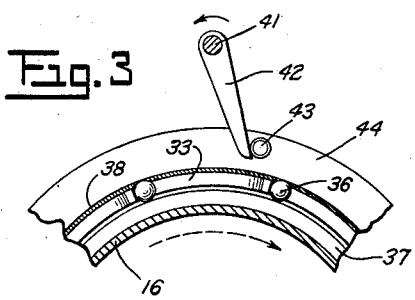
Figure 6:
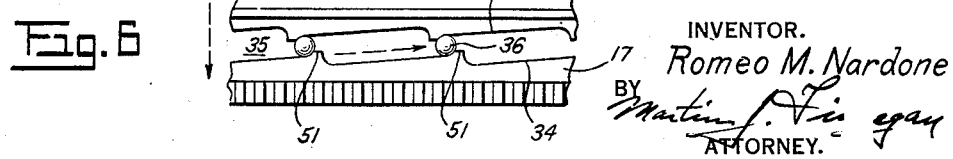

Brake element 14 and plate 17 have aligned cam tracks 33 and 34, respectively, forming sloping raceways 35 (Figs. 4, 5, and 6) which receive balls 36, the latter being retained in rolling engagement with an inner race 37 by the provision of retainer ring 38 (Fig. 1). Extending through the cowling 27 is a shaft 41 which is adapted to be rotated through a predetermined arc by suitable remote control means (not shown) attached to one end thereof, the other end being suitably machined to receive the brake applying lever 42 engageable with a pin 43 projecting from flange 44 of brake element 14, to swing the said brake element from the angular position indicated in Fig. 2 to that indicated in Fig. 3. A shoulder 46 on shaft 41 prevents axial movement of the shaft in the direction of the propeller, and a fastening device 47 permits the lever 42 to be locked in its properly adjusted position.

Figures 4, 5:
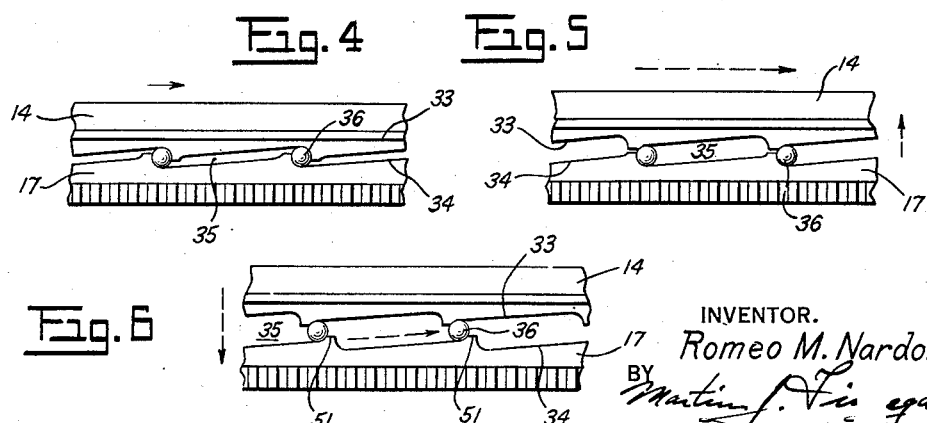
Figs. 4, 5 and 6 are diagrams indicating three positions of the brake controlling pressure plates, or cams.

In operation, a turning of shaft 41 is transmitted to the brake element 14 by way of lever 42 and pin 43, rotating the brake element sufficiently to move track 33 away from track 34—that is, from the relative position indicated in Fig. 4 to that indicated in Fig. 5. In the latter position brake element 14 has advanced (axially) sufficiently to engage brake shoe 13 with drum 11, tending to retard rotation of the propeller hub, and of course simultaneously causing the hub's rotary motion to be imparted to the brake element 14. The resulting rotary movement of brake element 14 thereupon carries balls 36 to the right (as viewed in the diagrams) until they reach the extending portions 51 of the track 34. The tracks 33 and 34 will then be separated to the maximum extent (Fig. 6) and springs 19 compressed to the maximum extent. In this position balls 36 have the effect of locking the brake shoe 13 against the propeller drum 11, since the continued momentum of the propeller, even as it slows down, tends to carry the balls past the extensions of track 34, which tendency operates to continue the separating pressure between the two tracks, and thus continues the axial thrust against brake shoe. This continued axial thrust soon brings the propeller to a full stop.

It is not necessary for the operator to continue to hold shaft 41 in the brake applying position, as the self energizing nature of the thrust action, as above described, automatically maintains the brake engaged, once it has been applied. To release it, the propeller must be turned back through an arc sufficient to return the brake element 14 (with the aid of spring 18) to the initial position, the balls 36 being simultaneously urged back to the positions indicated in Fig. 4, by the return rotation of track 33.

What I claim is:

1. In combination in a brake operating device, a laterally movable ring to take the torque reaction upon application of braking pressure, a second ring, manually operable, adjacent said laterally movable ring and capable of partial rotation relatively thereto, parallel inclined planes being formed on both said rings, a brake drum engageable by said second ring upon partial rotation of the latter, a bearing ball between each pair of said parallel inclined planes, and means comprising a ball-cage for holding the balls at constant distances apart.

2. In combination in a brake operating device, a laterally movable ring to take the torque reaction upon application of braking pressure, a second ring, manually operable, adjacent said laterally movable ring and capable of partial rotation relatively thereto, parallel inclined planes being formed on both said rings, a brake drum engageable by said second ring upon partial rotation of the latter, a bearing ball between each pair of said parallel inclined planes, means comprising a ball-cage for holding the balls at constant distances apart, a projection near the periphery of one of said rings, and means engageable with said projection to rotate said ring through an arc of a length equal to the distance between successive balls to produce the braking action.

ROMEO M. NARDONE.